B. H. SMITH.
ELECTRICAL PROTECTIVE DEVICE.
APPLICATION FILED MAR. 7, 1916.
1,224,332.
Patented May 1, 1917.
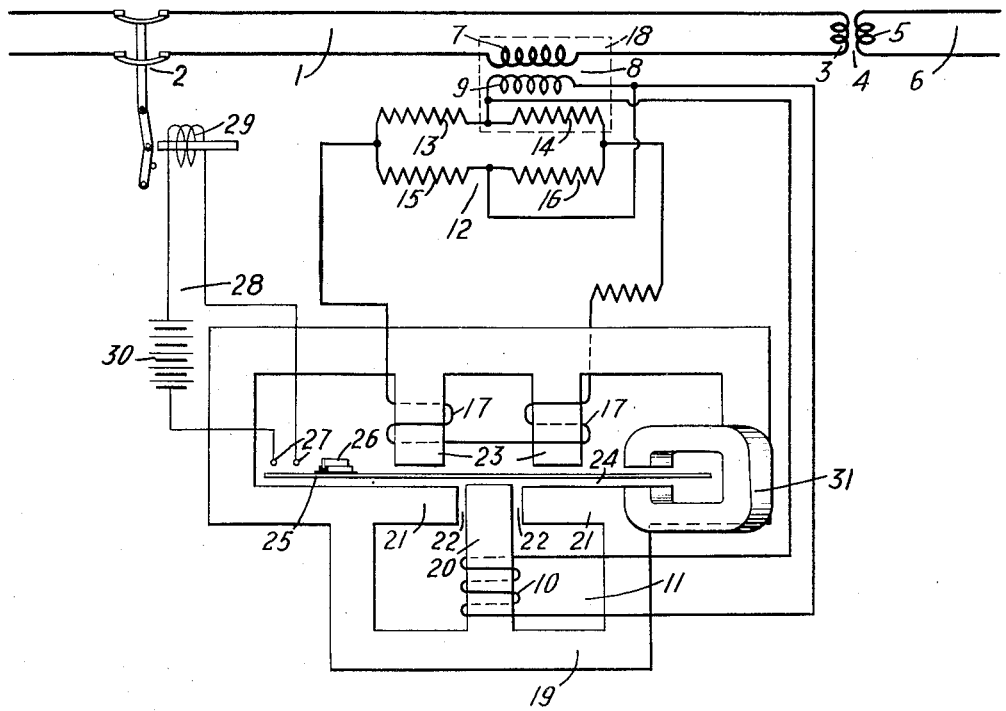
WITNESSES:
Fred. A. Lind.
J H Procter
INVENTOR
Benjamin H. Smith
BY
Wesley G. Carr
ATTORNEY

UNITED STATES PATENT OFFICE.

BENJAMIN H. SMITH, OF TURTLE CREEK, PENNSYLVANIA, ASSIGNOR TO WESTING-
HOUSE ELECTRIC AND MANUFACTURING COMPANY, A CORPORATION OF PENNSYL-
VANIA.

ELECTRICAL PROTECTIVE DEVICE.

1,224,332.  Specification of Letters Patent.  Patented May 1, 1917.

Application filed March 7, 1916. Serial No. 82,641.

*To all whom it may concern:*

Be it known that I, BENJAMIN H. SMITH, a citizen of the United States, and a resident of Turtle Creek, in the county of Allegheny and State of Pennsylvania, have invented a new and useful Improvement in Electrical Protective Devices, of which the following is a specification.

My invention relates to electrical protective devices and particularly to means for protecting electrical translating devices in accordance with the temperature of, and the load traversing, them.

One object of my invention is to provide a device of the above indicated character that is adapted to be actuated only when the temperature of the translating device to be protected and the current traversing the same reach predetermined values.

Another object of my invention is to provide an electro-responsive device having two coöperating windings one of which is energized in accordance with the temperature of the translating device to be protected and the other of which is energized in accordance with the current traversing the translating device.

Heretofore, time-limit relays have been provided for the purpose of tripping circuit interrupters upon the occurrence of persistent overloads and for preventing the tripping of the same upon the occurrence of momentary overloads.

Inasmuch as some translating devices are capable of carrying material overloads without injury, because of their superior ventilating, radiating and heat-dissipating properties, it is necessary to disconnect such devices from circuit only when their temperatures reach dangerous or destructive values.

Copending U. S. application Serial No. 51,867, filed September 21, 1915, by Charles Le G. Fortescue and assigned to the Westinghouse Electric and Manufacturing Company, discloses a resistor that is heated in accordance with the energy traversing the translating device. A constant - potential circuit, comprising a battery and an electro-responsive device, is connected across equal-potential points of the resistor. When the resistance of the resistor changes, because of the change in temperature, the current that traverses the electro-responsive device will vary substantially in accordance with the variations in the temperature of the resistor. If the resistor is so sufficiently lagged that its heat emissivity, temperature gradient at currents corresponding to given loads and the heat capacity of the same is the same as that of the translating device, and if the potential of the battery remains substantially constant, the electro-responsive device may be actuated in accordance with the temperature of the translating device. However, if the temperature of the translating device is so high that it ordinarily would be expedient to disconnect the same and if the load producing this high temperature should be suddenly reduced to a safe value, there would be no necessity of interrupting the circuit. In view of this, I provide an electrical-protective device or relay that is responsive both to the temperature and to the load of the translating device to be protected.

In the carrying out of my invention, I provide a relay of the induction type having two windings one of which is normally deënergized but is adapted to be energized in accordance with the rise in temperature of the translating device to be protected above predetermined values and the other winding of which is energized in accordance with the current traversing the translating device. The two windings are adapted to have substantially different inductances in order that the currents traversing them shall be out of phase with each other to permit their fluxes to coöperate to actuate the armature. Thus, the armature is adapted to be actuated in accordance with the temperature of, and the current traversing, the translating device to be protected.

The single figure of the accompanying drawing is a diagrammatic illustration of an electric system embodying my invention.

An electrical circuit 1 is provided with an interrupter 2 and the primary winding 3 of a transformer 4, the secondary winding 5 of which is connected to an electrical circuit 6. The primary winding 7 of a current transformer 8 is connected in circuit with the primary winding 3 of the transformer 4 and its secondary winding 9 is connected to the winding 10 of the relay 11 and to a Wheatstone bridge 12 in parallel relation.

The Wheatstone bridge 12 comprises four resistors 13, 14, 15 and 16 of such resistance that, when the temperature of the resistor 14 reaches a predetermined value, the bridge will become so unbalanced that current will traverse a winding 17 which also pertains to the relay 11. The resistor 14 constitutes the exploring resistor and is disposed in an oil-containing receptacle 18 with the transformer 8. The resistor 14 is sufficiently lagged or insulated to cause its temperature to vary in accordance with the temperature of the transformer 4. However, it may be disposed in the tank (not shown) of the transformer 4.

The relay 11 comprises a laminated magnetizable core member 19 having a member 20 that projects inwardly from one side and is surrounded by the winding 10, two members 21 that project inwardly at right angles to the member 20 and substantially in line with the free end thereof from which they are spaced by air gaps 22 and two members 23 that project inwardly from the side that is opposite the member 20 and are surrounded by the winding 17. The inner ends of the members 23 are spaced from the sides of the members 21 and the end of member 20 by an air gap 24. An armature 25 is disposed in the air gap 24 and is provided with a bridging contact member 26 that is adapted to engage stationary contact members 27 which constitute the terminals of a circuit 28 comprising a trip coil 29 and a source of electro-motive force 30. The armature 25 is adapted to turn between the poles of a permanent magnet 31 for the purpose of controlling its operation.

Assuming that a normal load traverses the circuit 1 and the transformer 4, and that the resistor 14 is of such resistance that the bridge 12 is balanced under this condition, if a sufficiently high overload traverses the transformer 4, the condition of balance in the bridge 12 will be upset and current will traverse the winding 17. The winding 10 is provided with energy in accordance with the current traversing the transformer 4, and the winding 17 is provided with current in accordance with the temperature of the transformer 4. Hence, since the windings 17 and 10 are of different inductances, the fluxes produced thereby are substantially out of phase and coöperate to actuate the armature 25 in accordance with the product of the two forces. Thus, the armature 25, subject to any desired time lag, may be caused to close the circuit 28 in accordance with the temperature of, the current traversing, the transformer 4.

My device is so arranged that, not only must the temperature of the translating device be above a predetermined value, but the current traversing the translating device must also be above a predetermined value. That is to say, the relay 12 is dependent upon two forces, neither of which is of sufficient magnitude to actuate the relay by itself. The reason for this may be readily seen when it is assumed that the temperature of the transformer 4 is of a dangerous value and the current traversing the same has been reduced to a non-dangerous value. When this condition obtains, it is not expedient to trip the circuit interrupter 2; neither is it expedient to trip the circuit interrupter 2 when the energy traversing the transformer 4 is of a dangerously high value until it persists for a sufficient period to increase the temperature of the transformer to a dangerously high value.

I desire it to be understood that my invention is not limited to the specific devices illustrated, but is adaptable to various modifications without departing from the spirit and scope of my invention as set forth in the appended claims.

I claim as my invention:

1. In an electric circuit, the combination with a Wheatstone bridge operatively connected to the circuit, one arm of the bridge being adapted to be heated in accordance with the current that traverses the circuit, of a relay having two windings thereon of relatively different inductances, one of the said windings being connected across normally equal-potential points on the bridge and the other winding being adapted to be energized in accordance with the current traversing the circuit.

2. The combination with a translating device and a protective device therefor, of a Wheatstone bridge operatively connected to the translating device, one arm of the bridge being adapted to be heated in accordance with the current that traverses the translating device, and a controlling relay for the protective device having one of its windings operatively connected to the bridge and its other winding adapted to be supplied with current in accordance with the current traversing the translating device.

3. The combination with a translating device and a protective device therefor, of a Wheatstone bridge operatively connected to the translating device, one arm of the bridge being adapted to be heated in accordance with the current that traverses the translating device, and a controlling induction relay for the protective device having one of its windings connected across normally equal-potential points of the bridge and its other winding connected to the translating device.

4. The combination with a translating device, of a normally balanced Wheatstone bridge operatively connected thereto, one arm of the bridge being adapted to be heated in accordance with the current traversing the translating device, and a relay having one of its windings responsive to the current traversing the translating device and its other winding responsive to the unbalancing of the bridge.

5. The combination with a translating device, of a relay having two windings of different inductances, one of said windings being supplied with current proportional to the current traversing the translating device and the other winding being supplied with current in accordance with the temperature of the translating device.

6. The combination with a translating device, of a normally balanced Wheatstone bridge operatively connected to the translating device and having one of its arms heated in accordance with the temperature of the translating device, and a relay having two coöperating windings one of which is connected to the translating device and the other of which is supplied with energy in accordance with the temperature of the translating device.

7. The combination with a translating device and a resistor adapted to be maintained at a temperature corresponding to the temperature of the translating device, of a Wheatstone bridge one arm of which comprises the resistor, and an induction motor-meter operatively connected across the four terminals of the bridge.

8. In an electric circuit, the combination with a translating device, of an electro-responsive device having one winding adapted to be energized in accordance with the temperature of the translating device and another winding adapted to be energized in accordance with the current traversing the translating device.

9. The combination with an electrical translating device, of a relay adapted to be actuated in accordance with the combined effect of the temperature of, and the current traversing, the translating device.

10. The combination with an electric circuit and a translating device operatively connected thereto, of a relay having windings adapted to receive current from the circuit in accordance with the combined effect of the temperature of, and the current traversing, the translating device.

11. The combination with an electrical translating device and a circuit-controlling means therefor, of means for actuating the circuit-controlling means in accordance with the combined effect of the current traversing, and the temperature of, the translating device.

12. The combination with an electric circuit, a translating device and a circuit-controlling means, of means connected to the circuit for actuating the circuit-controlling means in accordance with the combined effect of the temperature of, and the current traversing, the translating device.

13. A relay system for a translating device comprising a circuit-controlling means adapted to be actuated in accordance with the combined effect of the temperature of, and the load on, the translating device.

14. The combination with a translating device and a protective device therefor, of means for controlling the operation of the protective device in accordance with the combined effect of the load on, and the temperature of, the translating device.

In testimony whereof, I have hereunto subscribed my name this 29th day of Feb., 1916.

BENJAMIN H. SMITH.